(12) United States Patent
Ishii

(10) Patent No.: US 7,796,031 B2
(45) Date of Patent: Sep. 14, 2010

(54) MONITORING APPARATUS AND MONITORING METHOD

(75) Inventor: Satoshi Ishii, Kanagawa (JP)

(73) Assignee: Sony Corporation (JP)

( * ) Notice: Subject to any disclaimer, the term of this patent is extended or adjusted under 35 U.S.C. 154(b) by 157 days.

(21) Appl. No.: 11/998,334

(22) Filed: Nov. 29, 2007

(65) Prior Publication Data

US 2008/0136628 A1 Jun. 12, 2008

(30) Foreign Application Priority Data

Dec. 12, 2006 (JP) .......................... P2006-335018

(51) Int. Cl.
G08B 13/00 (2006.01)
(52) U.S. Cl. .................. 340/541; 340/568.1; 340/5.51; 340/3.43
(58) Field of Classification Search ................. 340/574, 340/679, 3.1, 3.43, 545.1, 545.3, 545.6–545.9, 340/551–561, 565–566, 568.1, 5.51, 541
See application file for complete search history.

(56) References Cited

U.S. PATENT DOCUMENTS

| | | | | |
|---|---|---|---|---|
| 5,258,837 A | * | 11/1993 | Gormley | 348/441 |
| 5,262,869 A | * | 11/1993 | Hong | 348/211.99 |
| 5,625,410 A | * | 4/1997 | Washino et al. | 348/154 |
| 5,751,296 A | * | 5/1998 | Furusawa et al. | 345/520 |
| 5,818,951 A | * | 10/1998 | Schivley | 382/100 |
| 5,909,548 A | * | 6/1999 | Klein et al. | 709/217 |

FOREIGN PATENT DOCUMENTS

| | | | |
|---|---|---|---|
| JP | 7-170551 A | | 7/1995 |
| JP | 9-120487 A | | 5/1997 |
| JP | 2001-211450 A | | 8/2001 |
| JP | 2002-281488 | * | 9/2002 |
| JP | 2002-281488 A | | 9/2002 |

* cited by examiner

*Primary Examiner*—Daniel Previl
(74) *Attorney, Agent, or Firm*—Lerner, David, Littenberg, Krumholz & Mentlik, LLP

(57) ABSTRACT

A monitoring apparatus using video data taken and outputted by a plurality of security imaging apparatuses for monitoring is disclosed. The apparatus includes: a display part configured to display the video data; an alarm generating part configured to analyze the video data and to generate an alarm in the case in which irregularities are detected in an imaging area on the security imaging apparatus; and a control part configured to conduct control in which the control part switches a display of a screen on the display part from a display of a screen in general monitoring to a display of a screen to display a taken image of the imaging area in which the irregularities are detected when the alarm generated in the alarm generating part is detected and returns the display to the display of the screen in general monitoring at a predetermined timing from the detection of the alarm.

8 Claims, 10 Drawing Sheets

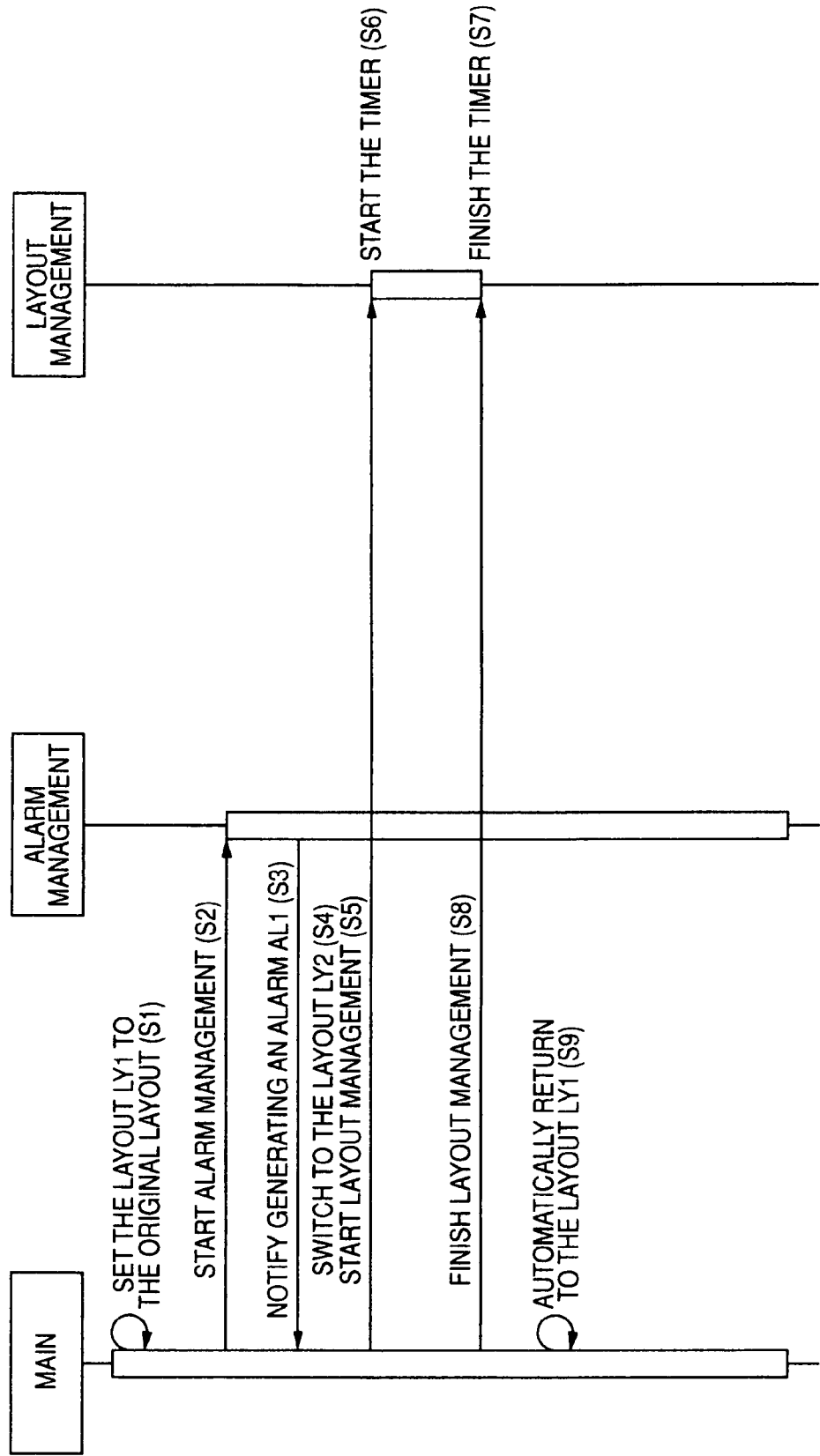

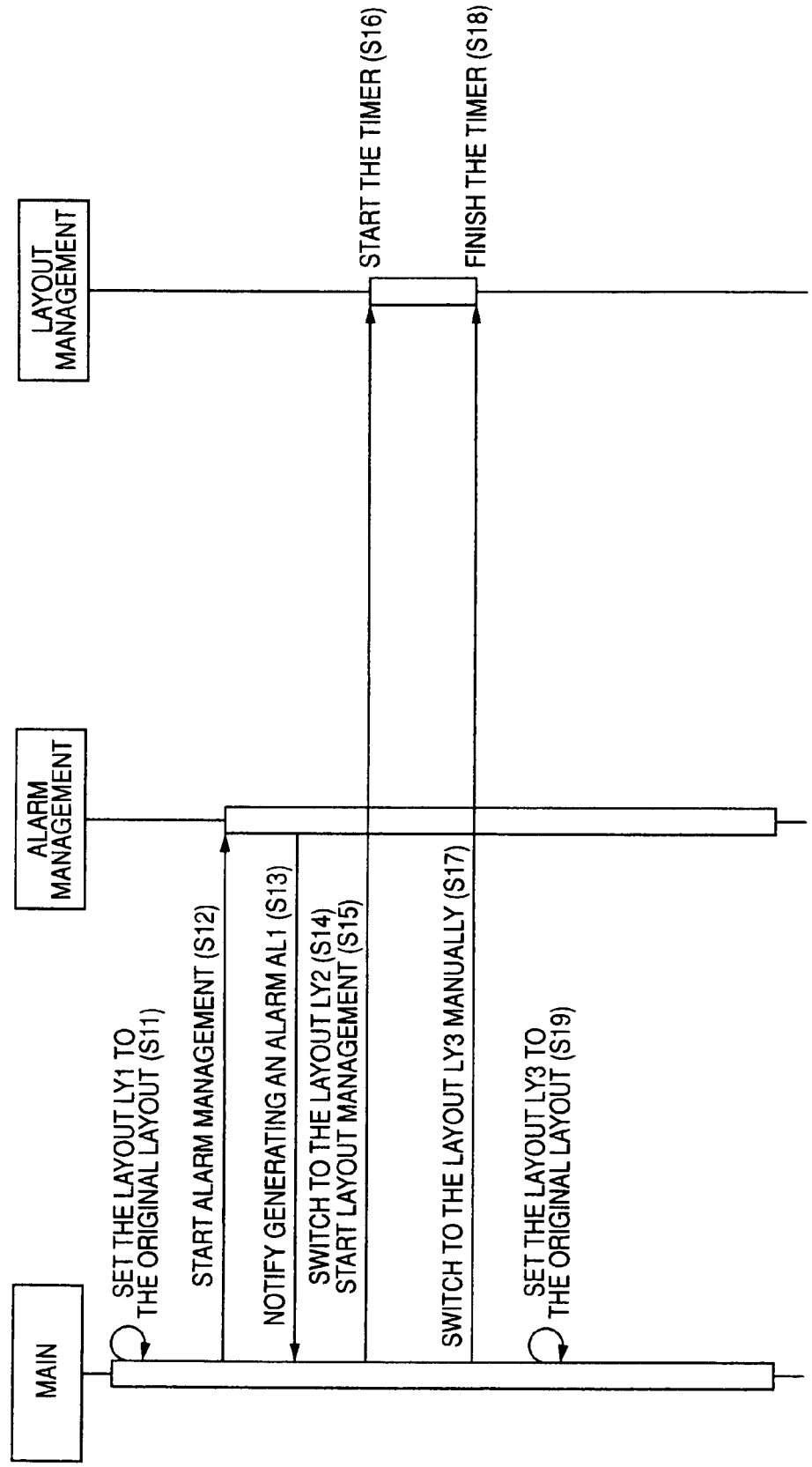

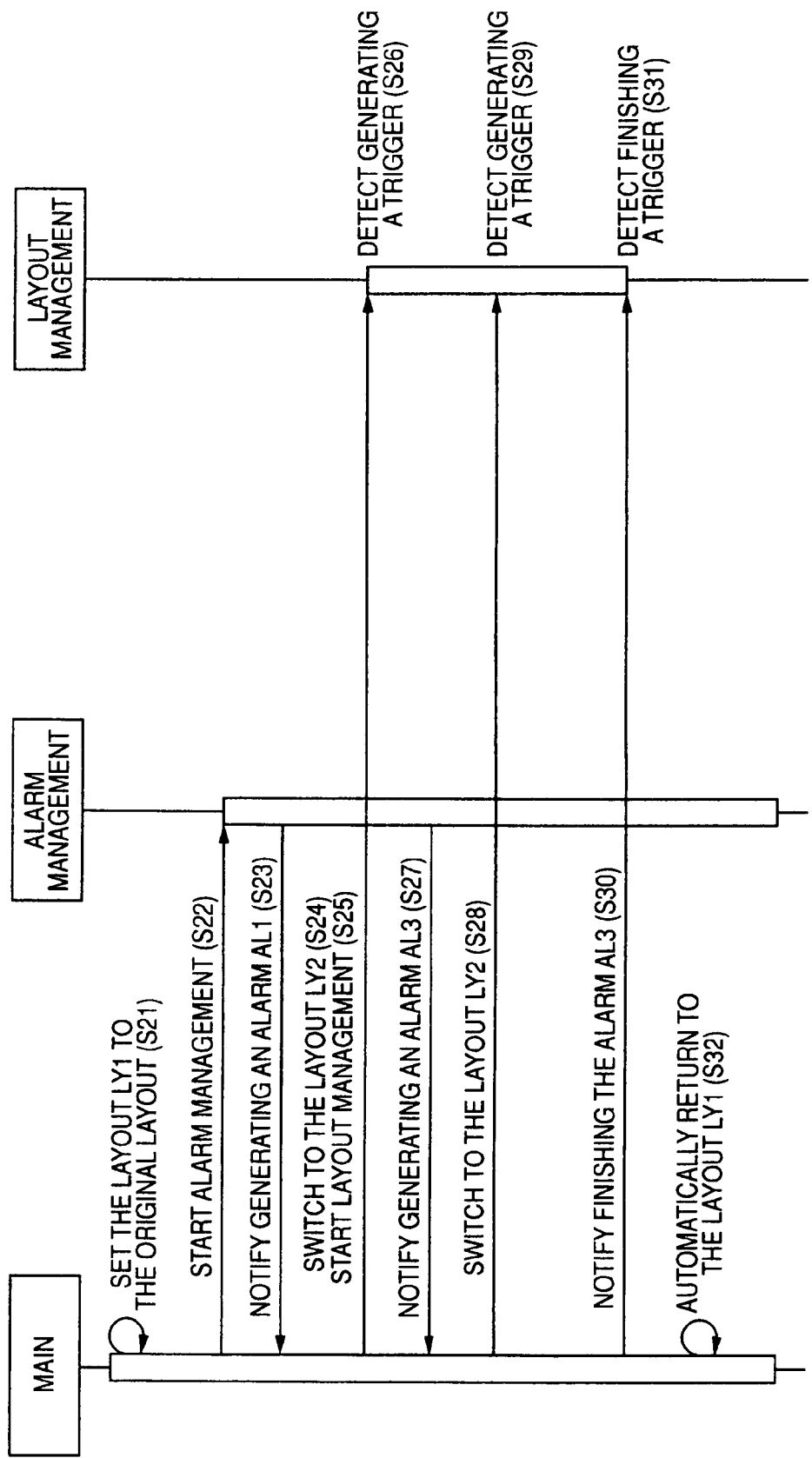

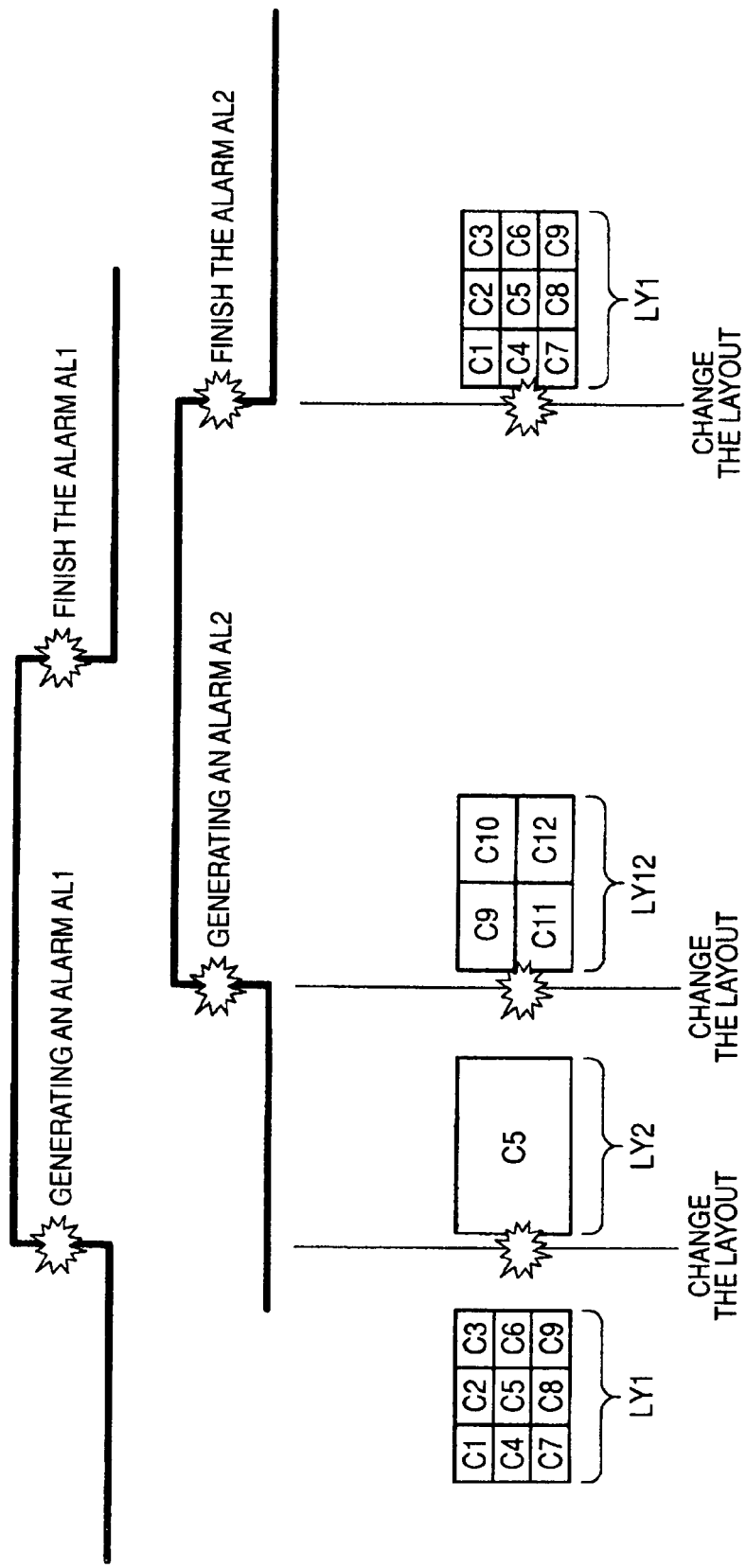

MONITORING APPARATUS AND MONITORING METHOD

CROSS-REFERENCE TO RELATED APPLICATIONS

The present application claims priority from Japanese Patent Application No. JP 2006-335018, filed in the Japanese Patent Office on Dec. 12, 2006, the entire content of which is incorporated herein by reference.

BACKGROUND OF THE INVENTION

1. Field of the Invention

The present invention relates to a monitoring apparatus and a monitoring method in which video data taken and outputted by a plurality of security imaging apparatuses is used for monitoring.

2. Description of the Related Art

Heretofore, a monitoring system is used in which a security camera is connected to a control unit via a network. In such a monitoring system, a security camera sends taken video data via a network to a monitoring apparatus that is a control unit. The monitoring apparatus analyzes the video data to detect the occurrence of irregularities, and outputs alarms. A monitoring person can monitor while he/she is confirming monitor video displayed on a monitor and the descriptions of the alarms outputted from the control unit.

In the monitoring system like this, in the case of monitoring a wide area such as an entire building, a plurality of security cameras are used. In this case, such a scheme is performed in which an area displayed on a single monitor is split into a plurality of areas and each of the pieces of video data taken by the plurality of the security cameras is displayed on the individual split areas. In the case in which the number of security cameras disposed is large, a problem arises that images taken by all the security cameras are displayed on a single monitor to increase the number of the split display areas, which causes the individual areas smaller. Smaller display areas cause a difficulty of finding irregularities on the screen, and the primary purpose of monitoring is not achieved.

On this account, in the case in which an alarm is generated, the display of the screen is switched so that the screen on which irregularities are found is automatically displayed on an entire single screen.

JP-A-2002-281488 (Patent Reference 1) discloses that an image with higher importance is displayed on a single screen among images obtained from a plurality of security cameras.

SUMMARY OF THE INVENTION

In the case of such a setting in which the display of a screen is switched to a screen on which the alarm is detected when an alarm is generated, the screen on which the alarm has been generated is kept displayed as it is, even after the alarm is finished and the irregular state is eliminated. When it is desired to again continue general monitoring after the irregular state is eliminated, a problem arises that it is necessary to manually switch the screen to the display of the screen before the screen is switched, which needs efforts.

In addition, in the case in which the number of security cameras disposed is large, because it is difficult to display all the images sent from the individual security cameras on a single screen, such a scheme is performed in which the number of images displayed on a single screen is fixed to four or six images and the security camera allocated to each of the split areas is switched at certain time periods to display images. Particularly in this case, there is a problem that a monitoring person has to know the patterns of display of the screen currently being monitored all the time so that the screen can be again returned to the display of the screen currently being monitored after the alarm is finished.

It is desirable to automatically return the display of a screen that has been switched when an alarm was generated to the display of a screen in general monitoring.

An embodiment of the invention is a monitoring apparatus which uses video data taken and outputted by a plurality of security imaging apparatuses for monitoring, the monitoring apparatus including: a display part configured to display the video data; and an alarm generating part configured to analyze the video data and to generate an alarm in the case in which the occurrence of irregularities is detected in an imaging area on the security imaging apparatus. Then, in the case in which the alarm generated in the alarm generating part is detected, a display of a screen on the display part is switched from a display of a screen in general monitoring to a display of a screen to display a taken image of the imaging area in which the occurrence of the irregularities is detected and the display is returned to the display of the screen in general monitoring at a predetermined timing from the detection of the alarm.

With this configuration, even though the display of the screen on the display part is switched from the display of the screen in general monitoring to the screen to display a taken image of the imaging area in which the occurrence of the irregularities is detected, the display can be automatically switched to the display of the screen in general monitoring at a predetermined timing.

According to the embodiment of the invention, the display can be automatically returned from the display of the screen switched when an alarm has been generated to the display of the screen in general monitoring.

BRIEF DESCRIPTION OF THE DRAWINGS

FIG. 4 shows a sequence diagram depicting an exemplary automatic layout return process based on specified times according to an embodiment of the invention;

FIG. 7 shows a sequence diagram depicting an exemplary automatic layout return according to an embodiment of the invention when layouts are manually switched;

FIG. 8 shows an illustration depicting an exemplary automatic layout return according to an embodiment of the invention when alarms are continuously generated;

FIG. 9 shows a sequence diagram depicting an exemplary automatic layout return according to an embodiment of the invention when alarms are continuously generated.

DETAILED DESCRIPTION OF THE INVENTION

Hereinafter, an embodiment of the invention will be described with reference to the accompanying drawing.

Figure 1:
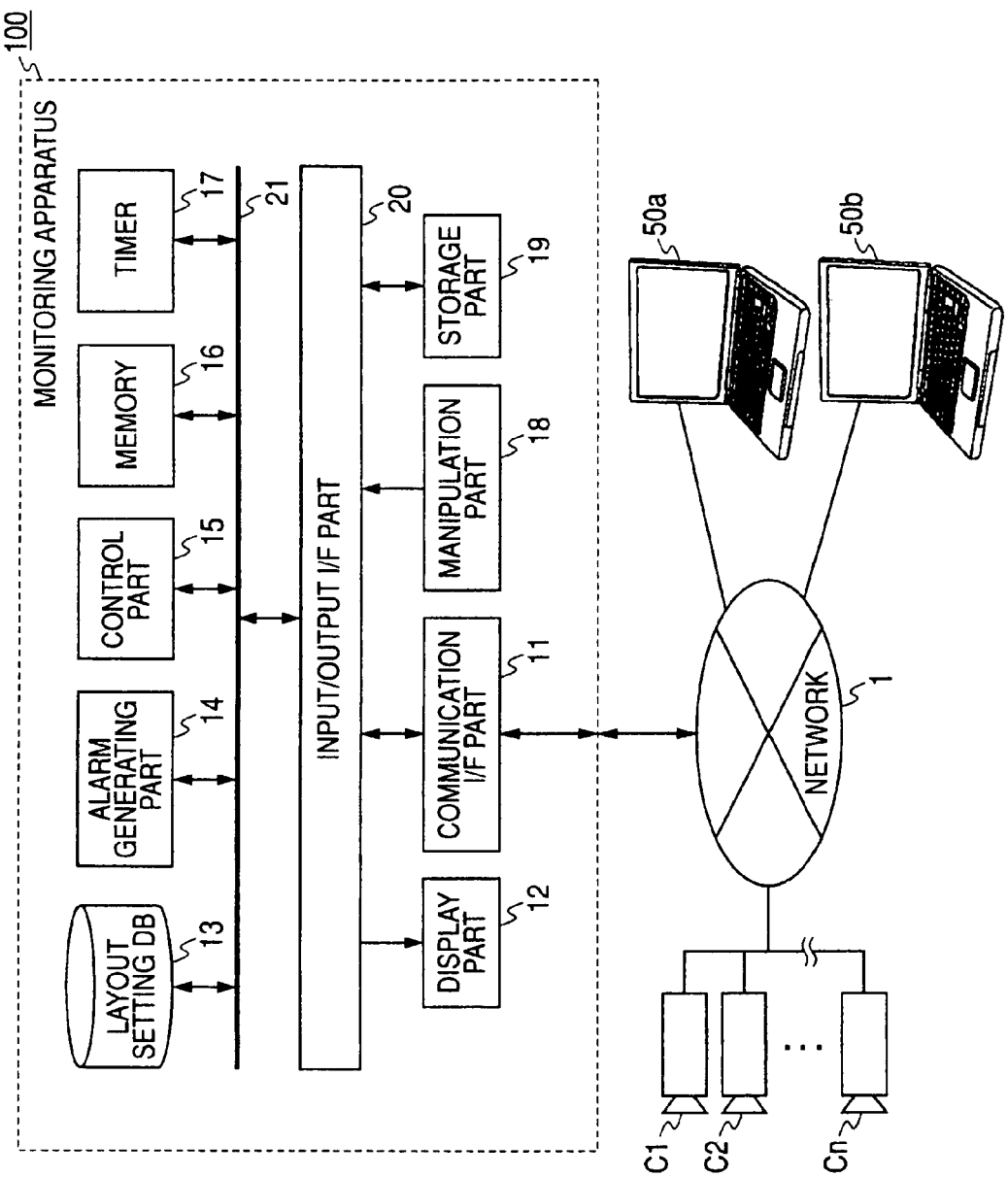
FIG. 1 shows a diagram depicting an exemplary configuration of a monitoring system according to an embodiment of the invention.

FIG. 1 shows a diagram depicting an exemplary configuration of a monitoring system using a monitoring apparatus according to the embodiment of the invention. The monitoring system shown in FIG. 1 is configured of a plurality of security cameras (security imaging apparatuses) C1 to Cn (n is an integer) that take monitoring areas, a monitoring apparatus 100 that controls the cameras, and monitoring client terminals 50a and 50b, and they are connected to each other over a network 1.

The security cameras C1 to Cn take video in the monitoring areas each allocated to the cameras, and send the taken video data to the monitoring apparatus 100. In addition, the security cameras C1 to Cn have a moving object/unmoving object detecting function, and send the detected result as attribute information (metadata) of video data to the monitoring apparatus 100.

The monitoring apparatus 100 has a communication I/F part 11 that is an interface with the network 1, and a display part 12 that displays images obtained from the security cameras C1 to Cn over the network 1. The display part 12 is configured of a liquid crystal panel, etc. For the display of the screen conducted on the display part 12, various display schemes can be used such as a pattern in which an image taken by a single security camera is displayed on the entire screen, and a pattern in which images taken by the security cameras C1 to Cn are each displayed in the individual areas split by the number of the security cameras. In this example, these various patterns are managed as "layouts", and various layouts are stored in a layout setting DB (database) 13.

Figure 2A:
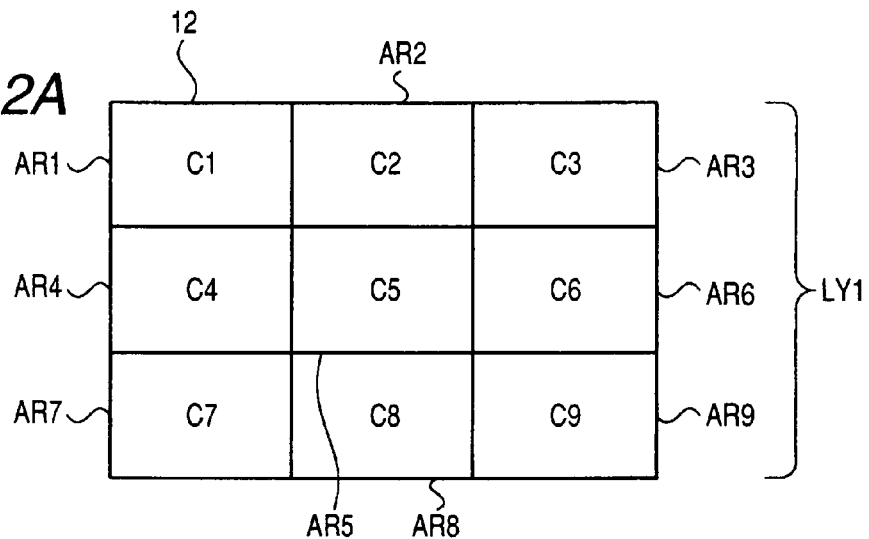
FIGS. 2A to 2C show an illustration depicting an exemplary layout according to an embodiment of the invention.

Here, specific examples of layouts will be described with reference to FIGS. 2A to 2C. Numerals and signs C1 to C9 shown in FIGS. 2A to 2C correspond to the security cameras C1 to C9 shown in FIG. 1. For example, in the area C1 denoted in FIG. 2A, an image taken by the security camera C1 is displayed. In the layout shown in FIG. 2A, the display part 12 is split into nine areas, areas AR1 to AR9, and images are displayed; images taken by the security camera C1 are displayed in the area AR1, images taken by the security camera C2 are displayed in the area AR2, images taken by the security camera C3 are displayed in the area AR3, images taken by the security camera C4 are displayed in the area AR4, images taken by the security camera C5 are displayed in the area AR5, images taken by the security camera C6 are displayed in the area AR6, images taken by the security camera C7 are displayed in the area AR7, images taken by the security camera C8 are displayed in the area AR8, and images taken by the security camera C9 are displayed in the area AR9. It is supposed that the layout shown in FIG. 2A is registered in the layout setting DB13 as a layout LY1, for example.

Figure 2B:
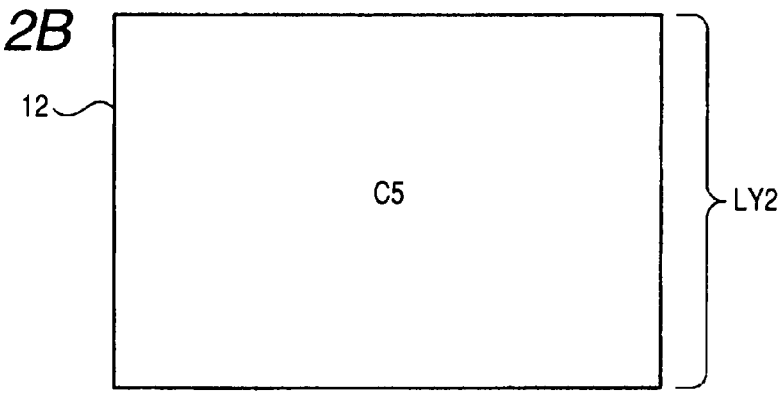
Figure 2C:
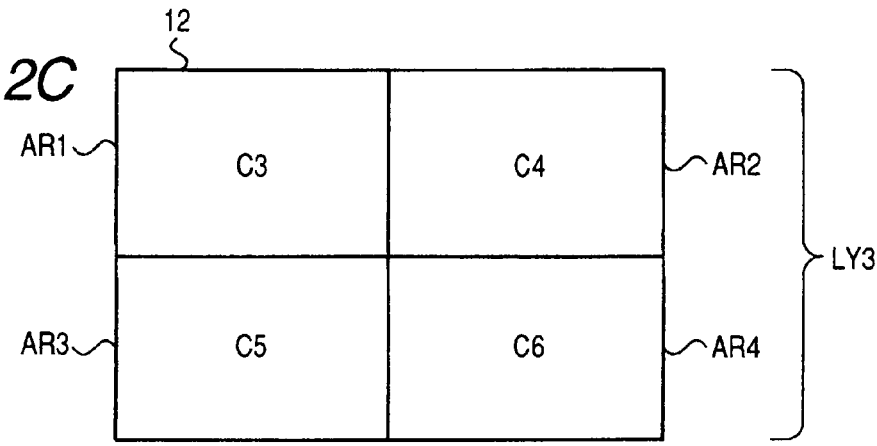

FIG. 2B shows a layout in which an image taken by the security camera C5 is displayed on the entire screen of the display part 12. It is supposed that the layout shown in FIG. 2B is registered as a layout LY2 in the layout setting DB13. In addition, in the layout shown in FIG. 2C, the area on the display part 12 is split into four areas, areas AR1 to AR4, and images are displayed; images taken by the security camera C3 are displayed in the area AR1, images taken by the security camera C4 are displayed in the area AR2, images taken by the security camera C5 are displayed in the area AR3, and images taken by the security camera C6 are displayed in the area AR4. It is supposed that the layout shown in FIG. 2C is registered as a layout LY3 in the layout setting DB13. In other words, the differences in the number of the split display areas and allocation of the security cameras to the split individual areas directly make the types of the layouts.

For example, in the case in which nine security cameras are disposed, as shown in FIG. 2A, it is possible to display images obtained by the individual security cameras on a single screen when the area on the display part 12 is split into nine areas. However, in the case in which many security cameras such as 20 to 30 cameras are connected, it becomes difficult to display images obtained from all the security cameras on a single screen. In this case, for example, as shown in FIG. 3, the display screen is switched for fixed time intervals to display images taken by all the security cameras.

Figure 3:
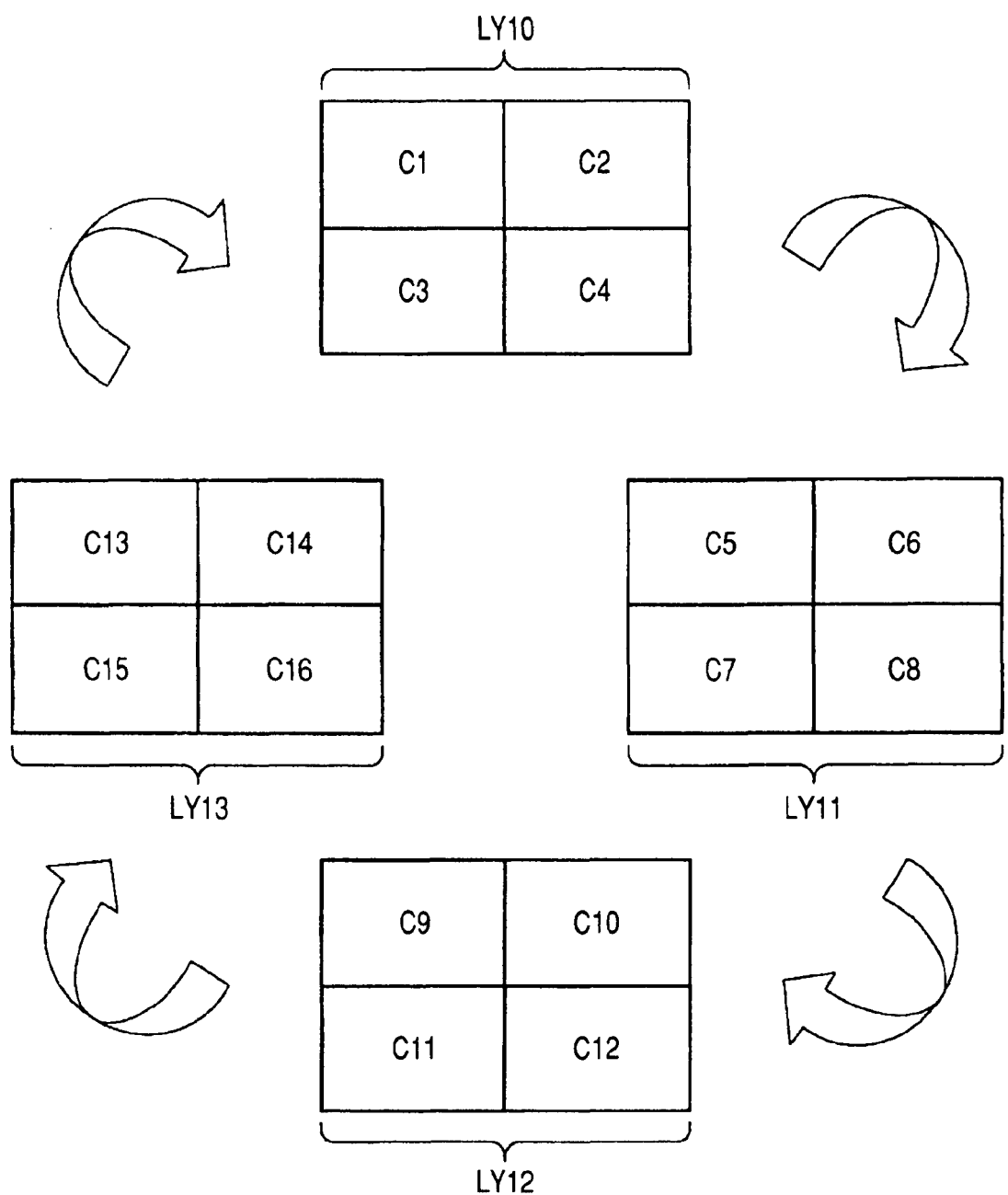
FIG. 3 shows an illustration depicting an exemplary layout sequence according to an embodiment of the invention.

In FIG. 3, in a topmost layout LY10, images taken by the security cameras C1 to C4 are displayed, and after a certain time period, the display is switched to a layout LY11 shown on the right side counterclockwise in the drawing to display images taken by the security cameras C5 to C8. Then, the display is switched to a layout LY12 to display images taken by the security cameras C9 to C12, and finally the display is switched to a layout LY13 to display images taken by the security cameras C13 to C16. As described above, the scheme in which the layouts are automatically switched and displayed for fixed time intervals is called a layout sequence. With the use of the layout sequence, images taken by all the security cameras can be in turn displayed on the display part 12 with no limits to the number of security cameras connected.

The discussion is continued again referring to FIG. 1. The monitoring apparatus 100 has an alarm generating part 14 that analyzes video data or metadata sent from the security cameras C1 to Cn and generates alarms when irregularities are detected. The alarm generating part 14 analyzes metadata of a plurality of frames to determine the velocity of a moving object from changes in its positions, or to confirm whether a moving object crosses over a certain line, or analyzes them in a combined manner, whereby it determines whether it is necessary to generate alarms. In the case in which it is necessary to generate alarms, it generates alarms. The alarms generated in the alarm generating part 14 are inputted to a control part 15.

The control part 15 is a central processor configured of a CPU (Central Processing Unit) and the like. To the control part 15, a memory part 16 is connected, and various programs such as program codes necessary for control are recorded in the memory 16. The control part 15 reads programs stored in the memory 16 to control the individual parts in the monitoring apparatus 100. For example, in the case in which an alarm generated in the alarm generating part 14 is detected, the control part 15 activates and executes the program recorded in the memory 16. Consequently, an instruction signal is supplied to the display part 12 to switch the screens, and the layout currently displayed is switched to the layout to display the screen on which the alarm is being generated.

In addition, in the embodiment of the invention, the alarm is generated to switch the display screen on the display part 12 to a certain layout, and then the layout is automatically returned to the original layout after a predetermined time period. The monitoring apparatus 100 has a timer 17 that measures time. In addition, the monitoring apparatus 100 has a manipulating part 18 configured of a mouse, a keyboard and the like, and a storage part 19 in which video data obtained by the security cameras C1 to Cn is stored. The communication I/F part 11, the display part 12, the manipulating part 18, and the storage part 19 are connected to a transmission line 21 through an input/output I/F part 20.

For example, the client terminals 50a and 50b connected to the monitoring system over the network 1 are arranged on remote sites, which can monitor video data taken by the security cameras C1 to Cn. In addition, since layouts can be specified with respect to the monitoring apparatus 100, the client terminal 50a or 50b can conduct monitoring using the specified layout.

Next, an exemplary process in the case in which an alarm is generated to switch the display screen on the display part 12 to a certain layout and then the layout is automatically returned to the original layout after a predetermined time period will be described with reference to a sequence diagram shown in FIG. 4. In this example, the layout desired to be automatically returned (the layout in general monitoring) is defined as the "original layout", and a desired layout can be set as the original layout.

In FIG. 4, portions "main", "alarm management", and "layout management" denote objects in a process algorithm for implementing the embodiment of the invention. In "alarm management", signal or data exchange is performed with the alarm generating part 14 (see FIG. 1), in "layout management", data write or read to the layout setting DB13 is performed, and in "main", signal or data exchange is performed with the other individual parts such as the control part 15 and the display part 12.

In FIG. 4, first, the layout LY1 is set as the original layout (see FIG. 2A) (Step S1). Then, from this point in time, alarm management is started (Step S2). In alarm management, the timing at which an alarm is generated in the alarm generating part 14, the alarm type and the like are managed. After alarm management is started, at the timing at which an alarm is generated in the alarm generating part 14, it is notified that the alarm is generated (the alarm is sent to the control part 15) (Step S3). In FIG. 4, the alarm generated here is an alarm AL1.

The control part 15 is notified that the alarm AL1 is generated, and then it instructs the display part 12 to switch the layout to the layout LY2 to display the screen on which the alarm AL1 is generated. Based on this instruction, the layout displayed on the display part 12 is switched from the layout LY1 to the layout LY2 (Step S4). Then, at the same time when switching to the layout LY2, the layout management is started (Step S5). In layout management, depending on the alarm type and the generated timing, controls over the operation of the timer 17 and layout switching are conducted.

After layout management begins, measuring time in the timer 17 is started (Step S6). In the example shown in FIG. 4, it is supposed that the layout is automatically returned to the original layout at the point in time after one minute has elapsed in the measured time in the timer 17. After one minute has elapsed to stop the timer 17 (Step S7), at the same time, layout management is also finished (Step S8). In addition, at the same time when layout management is finished, the display is switched to the layout LY1 already registered as the original layout (Step S9).

Figure 5A:
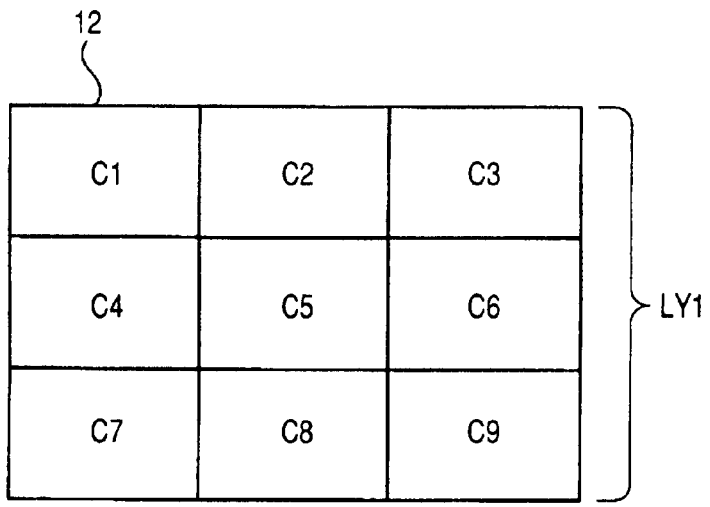
FIGS. 5A to 5C show an illustration depicting an exemplary automatic layout return according to an embodiment of the invention.
Figure 5B:
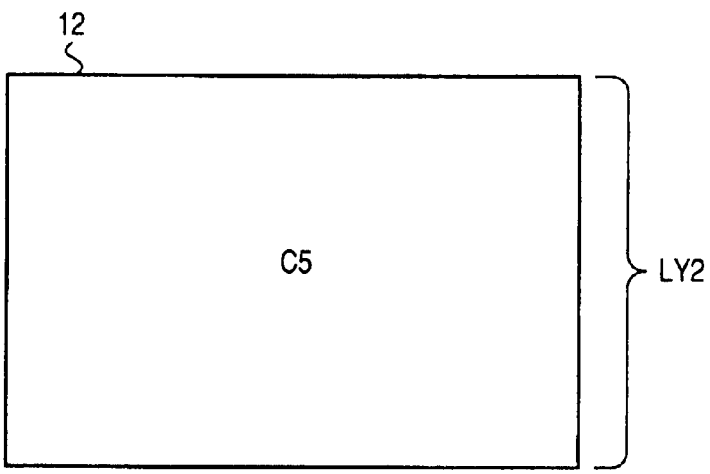
Figure 5C:
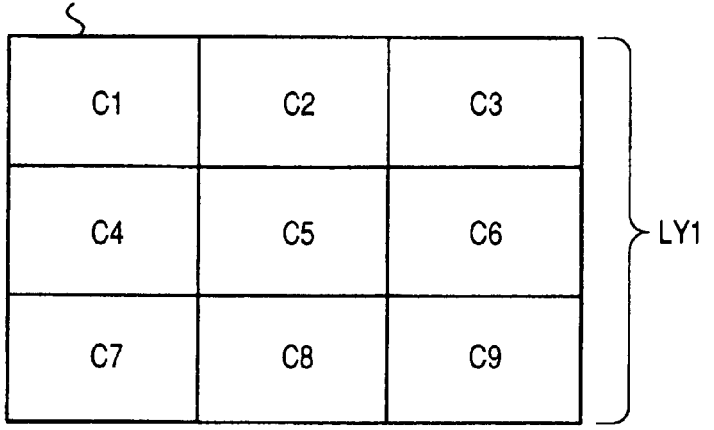

With this configuration, even though an alarm is generated to switch the screen displayed on the display part 12 to the display of a certain layout, the layout is automatically returned to the original layout based on the preset time that a user sets in advance. FIGS. 5A to 5C show the changes in the display of the layout on the display part 12 in the example shown in FIG. 4.

FIG. 5A shows the layout LY1 set as the original layout, and during the period which the layout LY1 is applied, images taken by the security cameras C1 to C9 are displayed in the individual areas on the display part 12. In this state, the alarm generating part 14 generates an alarm (the alarm AL1 shown in FIG. 4) from video data taken by the security camera C5 and metadata (Step S3 shown in FIG. 4), and then the display screen on the display part 12 is switched to the layout LY2 shown in FIG. 5B. In the layout LY2, an image taken by the security camera C5 from which irregularities are detected is displayed on the entire screen. Then, after the timer 17 measures one minute, the display is again switched to the original layout (the layout LY1) shown in FIG. 5C.

In FIGS. 5A to 5C, an exemplary screen transition is shown in the case in which the layout to be displayed in conducting general monitoring is fixed to the layout LY1, but even though in the case in which the layout sequence is conducted, the process of automatic return to the original layout can be similarly adapted.

Figure 6A:
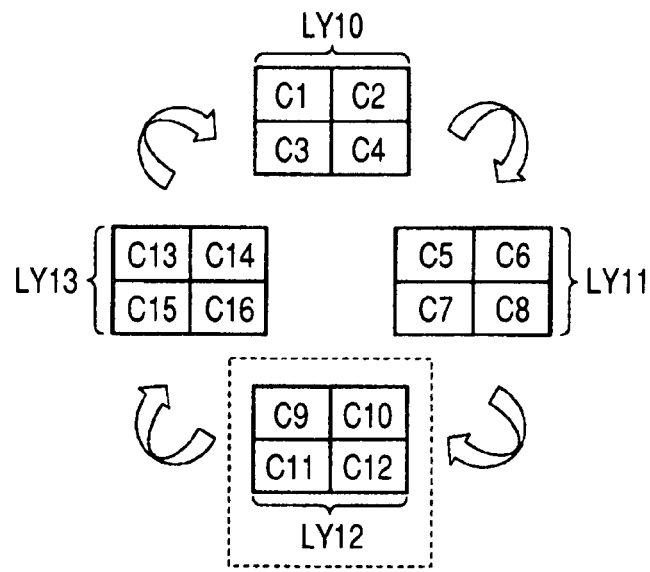
FIGS. 6A to 6C show an illustration depicting an exemplary automatic layout sequence return according to an embodiment of the invention.
Figure 6B:
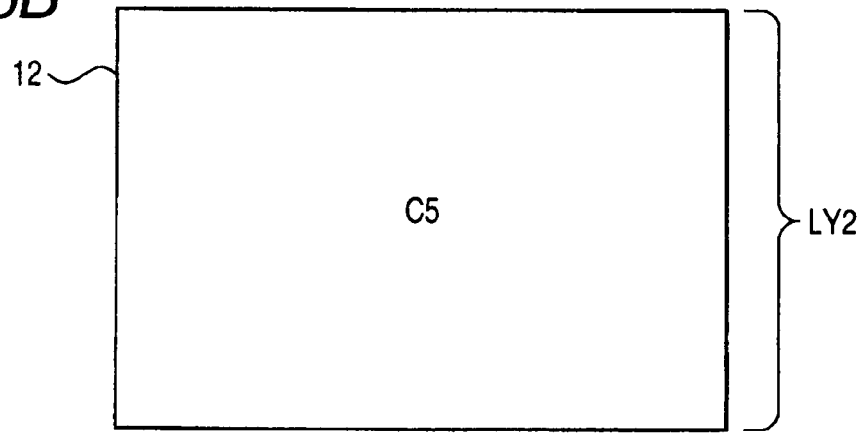
Figure 6C:
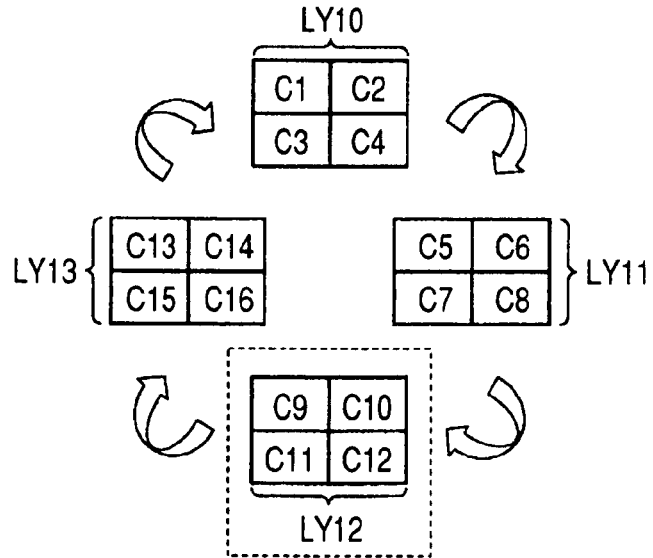

FIGS. 6A to 6C show a diagram depicting screen transition in the case in which the layout is automatically returned to the original layout in conducting the layout sequence. As shown in FIG. 6A, in the case in which such a layout sequence is adapted that layouts are in turn switched and displayed on the display screen among a layout LY10 to display images taken by the security cameras C1 to C4, a layout LY11 to display images taken by the security cameras C5 to C8, a layout LY12 to display images taken by the security cameras C9 to C12, and a layout LY13 to display images taken by the security cameras C13 to C16, the layout to be a target for automatic return is the layout displayed right before generating an alarm. In FIG. 6A, it is supposed that the layout is the layout LY12 surrounded by a broken line.

In this state, the alarm generating part 14 generates an alarm from video data taken by the security camera C5 and metadata, and then the display screen on the display part 12 is switched to the layout LY2 shown in FIG. 6B. Then, at the time when the time period measured by the timer 17 reaches the preset time, the display on the display part 12 is switched to the layout LY12 displayed right before generating the alarm as shown in FIG. 6C.

However, when a user makes a manipulation input to the manipulating part 18 to manually change the layout in the case in which the layout is conducted in a fixed manner and in the case of conducting the layout sequence, the original layout currently set is overwritten by the layout manually changed. In other words, the layout manually changed becomes a new original layout (the layout to be a target for automatic return).

FIG. 7 shows an exemplary automatic layout return process in the case in which the layout is manually changed. First, the layout LY1 is set as the original layout (Step S11). Then, from this point in time, alarm management is started (Step S12). After alarm management is started, it is notified that the alarm AL1 is generated at the timing at which the alarm is generated in the alarm generating part 14 (Step S13).

The notice of generating the alarm AL1 is received, and then the layout displayed on the display part 12 is switched from the layout LY1 to the layout LY2 (Step S14). Then, at the same time when switching to the layout LY2, layout management is started (Step S15). After layout management is started, measuring time in the timer 17 is started (Step S16). The layout is manually changed to the layout LY3 during the period which the timer 17 is measuring time (Step S17), and then measuring time in the timer 17 is also stopped in association with this change (Step S18). Then, the layout LY3 manually changed is set to the original layout (Step S19).

In the examples shown in FIGS. 4 and 7, automatic return to the original layout is conducted based on the specified time, but such a form may be performed in which automatic return to the original layout is conducted in association with the end of an alarm (a trigger to change the layout). In this case, intervals to generate alarms, the length of generating alarms or the like are specified, the start and end of the trigger to change the layout is defined in advance, and then the layout displayed on the display part 12 is switched to the original layout at the point in time when the end of the trigger is detected. With this setting, at the time of the end of the trigger, that is, at the time when the irregular state is eliminated, the display screen is automatically returned to the original layout.

Next, an exemplary process will be described with reference to FIGS. 8 and 9 in the case in which different alarms are continuously generated in the state in which alarm management is started. The example shown in FIG. 8 is an example adapted to the form in which the layout is returned to the original layout at the timing at which the end of the trigger is detected.

In FIG. 8, first, the layout LY1 is set as the original layout (Step S21). Then, from this point in time, alarm management is started (Step S22). After alarm management is started, it is notified that the alarm AL1 is generated at the timing at which the alarm is generated in the alarm generating part 14 (Step S23).

The notice of generating the alarm AL1 is received, and then the layout displayed on the display part 12 is switched from the layout LY1 to the layout LY2 (Step S24). Then, at the same time when switching to the layout LY2, layout management is started (Step S25). After layout management is started, the generation of the alarm AL1 is recognized as the generation of a trigger (Step S26), and the layout LY2 corresponding to the alarm AL1 is displayed on the display part 12 until the end of the trigger.

During this period, in layout management, a process is performed to wait for the end of the trigger.

During the period which the process of waiting for the end of the trigger is performed, it is noticed that another alarm AL3 is generated (Step S27), and then the display is switched to the layout LY12 to display the screen on which the alarm AL3 is generated (Step S28). At this time, in layout management, the alarm AL3 is recognized as a new trigger (Step S29), and the target trigger for the process of waiting for the end of the trigger is changed to the alarm AL3. In other words, at this point in time, the timing of returning to the original layout is changed from the end of the alarm AL1 to the end of the alarm AL3. Then, the end of the alarm AL3 is noticed (Step S30), the end of the trigger is then recognized (Step S31), and the display screen is automatically returned to the layout LY1 as the original layout (Step S32).

FIG. 9 shows comparisons between alarm generation and layout change in this case in a time series, showing that before the alarm AL1 is generated, the layout LY1 that is the original layout is displayed, and at the same time when the alarm AL1 is generated, the layout is switched to the layout LY2. Although the layout is switched to LY12 when the alarm AL2 is generated that is a new alarm, the target trigger for the process of waiting for the end of the trigger is changed from the alarm AL1 to the alarm AL2 at the point in time of generating the alarm AL2. Therefore, at the point in time of the end of the alarm AL1, automatic return to the original layout is not conducted. The layout is not returned to the layout LY1 that is the original layout until the alarm AL2 is ended.

The timing of automatic return to the original layout is adjusted not only in the case in which different alarms are continuously generated as described with reference to FIGS. 8 and 9, but also in the case in which the same alarms are continuously generated at fixed time intervals.

Figure 10:
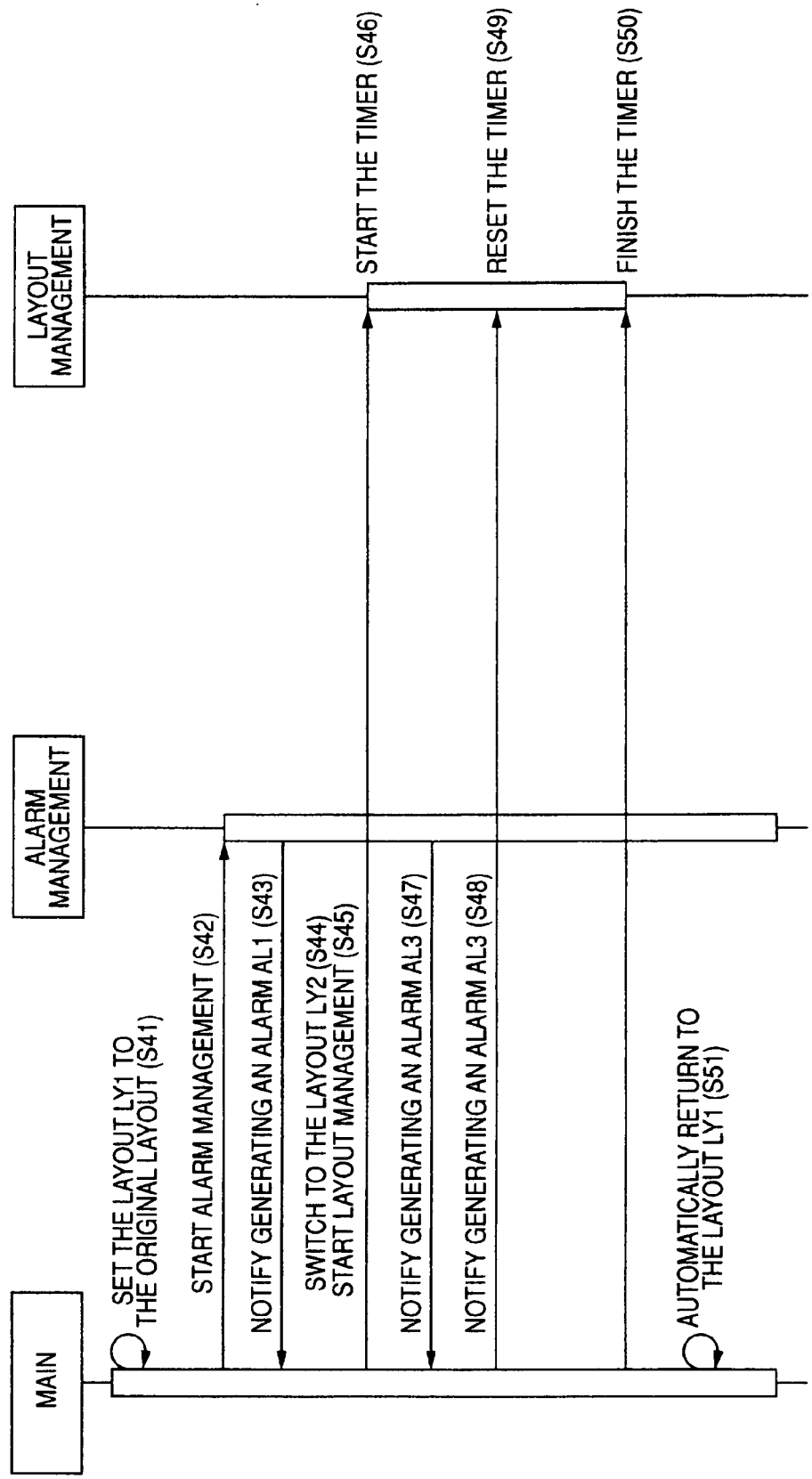
FIG. 10 shows a sequence diagram depicting an exemplary automatic layout return according to an embodiment of the invention when alarms are continuously generated.

FIG. 10 shows a sequence diagram depicting an exemplary process in the case in which the same alarms are continuously generated in the form in which the layout is returned to the original layout in accordance with the measured time in the timer 17.

In FIG. 10, first, the layout LY1 is set as the original layout (Step S41). Then, from this point in time, alarm management is started (Step S42). After alarm management is started, it is notified that the alarm AL1 is generated at the timing at which the alarm is generated in the alarm generating part 14 (Step S43).

The notice of generating the alarm AL1 is received, and then the layout displayed on the display part 12 is switched from the layout LY1 to the layout LY2 (Step S44). Then, at the same time when switching to the layout LY2, the layout management is started (Step S45). After layout management is started, measuring time in the timer 17 is started (Step S46).

During the period which the timer 17 is measuring time, it is again noticed that the alarm AL1 is generated (Step S47), information about that is also sent to layout management (Step S48), and then the timer 17 is reset (Step S49). Then, the timer 17 again starts measuring time from this point in time. The time measured in the timer 17 reaches a preset time period such as one minute, measuring time in the timer 17 is stopped (Step S50), and then the layout is automatically returned to the layout LY1 that is the original layout (Step S51).

As described above, in the case in which different alarms are continuously generated, and in the case in which the same alarms are continuously generated, the target alarm for measuring time in the timer 17 or the target alarm for the process of waiting for the end of the trigger is changed to the alarm (the latest alarm) generated later time. Therefore, such an event can be eliminated that the display screen is automatically returned to the original layout without eliminating the irregular state.

With the configuration above, since the display screen is automatically returned to the original layout at the time of end of measurement by the timer and the end of the trigger, it is unnecessary for a monitoring person to manually switch the display to the original layout. Accordingly, the load in the operations by the monitoring person can be reduced.

In addition, also in the case in which the layout sequence is adapted for monitoring, the display screen is automatically returned to the original layout at the time of end of measurement by the timer and the end of the trigger. Therefore, it is unnecessary for a monitoring person to remember the layout displayed before switched.

In addition, since the process of automatic return to the original layout is not conducted in the case in which a monitoring person manually changes the layout, such an event can be eliminated that the layout that has been changed by a monitoring person on purpose is switched to the original layout.

Moreover, in the embodiment discussed so far, the configuration is taken and described as an example in which the client terminals 50a and 50b are connected to the monitoring apparatus 100, but the embodiment of the invention may be adapted to the configuration in which no client terminal is connected.

It should be understood by those skilled in the art that various modifications, combinations, sub-combinations and alterations may occur depending on design requirements and other factors insofar as they are within the scope of the appended claims or the equivalents thereof.

What is claimed is:

1. A monitoring apparatus which uses video data taken and outputted by a plurality of security imaging apparatuses for monitoring, the monitoring apparatus comprising:

a display part configured to display the video data;

an alarm generating part configured to analyze the video data and to generate an alarm in the case in which occurrence of irregularities is detected in an imaging area on the security imaging apparatus; and a control part configured to conduct control in which the control part switches display of a plurality of screens in general monitoring on the display part in turn, wherein each of the screens in general monitoring has a first layout, and in which the control part switches a display of a screen on the display part from a display of a first screen in general monitoring of the plurality of screens in general monitoring to a display of a screen having a second layout to display a taken image of the imaging area in which the occurrence of the irregularities is detected in the case in which the alarm generated in the alarm generating part is detected and returns the display to the display of the first screen in general monitoring at a predetermined timing from the detection of the alarm, wherein the first layout is different from the second layout.

2. The monitoring apparatus according to claim 1, wherein the predetermined timing is a timing at which the generation of an alarm by the alarm generating part is finished.

3. The monitoring apparatus according to claim 2, wherein in the case in which a display of a screen on the display part is manually switched, the control part does not conduct control of returning the display to the display of the screen in general monitoring, and sets the display of the screen manually switched to the display of the screen in general monitoring.

4. The monitoring apparatus according to claim 2, wherein in the case in which an alarm is generated in the alarm generating part during a period which a taken image of the imaging area is displayed on the display part in which the irregularities are generated, the control part changes the predetermined timing to a timing at which a latest alarm generated in the alarm generating part is finished.

5. The monitoring apparatus according to claim 1, further comprising a timer configured to measure time, wherein the predetermined timing is a timing at which a time measured by the timer reaches a preset time.

6. The monitoring apparatus according to claim 5, wherein in the case in which a display of a screen on the display part is manually switched, the control part does not conduct control of returning the display to the display of the screen in general monitoring, and sets the display of the screen manually switched to the display of the screen in general monitoring.

7. The monitoring apparatus according to claim 5, wherein in the case in which an alarm is generated in the alarm generating part during a period which the timer is measuring time, the timer is reset.

8. A monitoring method of using video data taken and outputted by a plurality of security imaging apparatuses for monitoring, the method comprising the steps of:

displaying the video data;

analyzing the video data and generating an alarm in the case in which occurrence of irregularities is detected in an imaging area on the security imaging apparatus; and switching a display of a screen on which the video data is displayed to display a plurality of screens in general monitoring in turn, wherein each of the screens in general monitoring have a first layout; and switching from a display of a first screen in general monitoring of the screens in general monitoring to a display of a screen having a second layout to display a taken image of the imaging area in which the occurrence of the irregularities is detected when the alarm is detected and returning the display to the display of the first screen in general monitoring at a predetermined timing from the detection of the alarm, wherein the first layout is different from the second layout.

* * * * *